(12) United States Patent
Yong

(10) Patent No.: US 8,866,969 B2
(45) Date of Patent: Oct. 21, 2014

(54) DISPLAY APPARATUS AND CONTROL METHOD OF THE SAME

(71) Applicant: Samsung Electronics Co., Ltd., Suwon-si (KR)

(72) Inventor: Seok-woo Yong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/894,026

(22) Filed: May 14, 2013

(65) Prior Publication Data

US 2013/0308054 A1 Nov. 21, 2013

(30) Foreign Application Priority Data

May 15, 2012 (KR) .................. 10-2012-0051351

(51) Int. Cl.
*H04N 5/44* (2011.01)
*H04N 21/485* (2011.01)
*H04N 21/422* (2011.01)

(52) U.S. Cl.
CPC ........... *H04N 5/4403* (2013.01); *H04N 21/485* (2013.01); *H04N 21/42202* (2013.01)
USPC ........... 348/561; 348/569; 348/656; 348/535; 348/706; 348/720; 348/725; 348/729; 348/731; 348/734; 348/707.1; 348/211.1; 348/211.8; 348/241; 348/14.02; 348/14.03; 348/14.04; 348/14.05; 348/14.01; 348/73; 725/34; 725/38; 725/39; 725/40; 725/43; 725/68; 725/81; 725/130; 725/133; 725/145; 715/234; 715/700; 715/707; 715/733; 715/748; 715/762; 345/156; 345/650; 345/661

(58) Field of Classification Search
USPC ......... 348/561, 720, 725, 731, 734, 569, 535, 348/656, 706, 729, 14.02, 14.03, 14.04, 348/14.05, 73, 207.11, 211.1, 211.8, 241; 345/156, 740, 650, 661; 725/38, 34, 725/39, 13, 135, 130, 40, 43, 68, 81, 133, 725/145; 715/234, 700, 707, 733, 748, 762
See application file for complete search history.

(56) References Cited

U.S. PATENT DOCUMENTS

| | | | |
|---|---|---|---|
| 6,941,154 B1 | 9/2005 | Ritter | |
| 7,526,279 B1 | 4/2009 | Fujisaki | |
| 7,738,834 B2 * | 6/2010 | Rischmueller | 455/3.06 |
| 7,907,942 B1 | 3/2011 | Fujisaki | |
| 8,248,540 B2 * | 8/2012 | Hayashi et al. | 348/734 |

(Continued)

OTHER PUBLICATIONS

Communication, dated Mar. 28, 2013, issued by the European Patent Office in counterpart European Application No. 13162353.0.

(Continued)

*Primary Examiner* — Jefferey Harold
*Assistant Examiner* — Mustafizur Rahman
(74) *Attorney, Agent, or Firm* — Sughrue Mion, PLLC

(57) ABSTRACT

A display apparatus includes a receiver which receives a broadcasting signal, a display which displays an image based on the received broadcasting signal, a communication unit which communicates with a mobile device, and a controller which determines whether the mobile device interferes with at least one channel of a plurality of broadcasting channels received through the receiver, and controls the display to display a user interface (UI) indicates a user whether image noise has resulted from channel interference by the mobile device.

21 Claims, 8 Drawing Sheets

(56) References Cited

U.S. PATENT DOCUMENTS

| | | |
|---|---|---|
| 8,646,000 B2 * | 2/2014 | Kang et al. ............... 725/39 |
| 2004/0165006 A1 | 8/2004 | Kirby et al. |
| 2004/0237104 A1 * | 11/2004 | Cooper et al. ............... 725/38 |
| 2007/0066228 A1 | 3/2007 | Leinonen et al. |
| 2007/0097272 A1 | 5/2007 | Moradi et al. |
| 2008/0052083 A1 | 2/2008 | Shalev et al. |
| 2008/0074554 A1 * | 3/2008 | Han et al. ............... 348/720 |
| 2008/0320514 A1 | 12/2008 | DaCosta |
| 2009/0239510 A1 * | 9/2009 | Sennett et al. ............ 455/414.1 |
| 2010/0159833 A1 | 6/2010 | Lewis et al. |
| 2010/0159860 A1 * | 6/2010 | Jothy ............... 455/154.2 |
| 2011/0083069 A1 | 4/2011 | Paul et al. |
| 2011/0138317 A1 * | 6/2011 | Kang et al. ............... 715/780 |
| 2011/0138416 A1 * | 6/2011 | Kang et al. ............... 725/39 |
| 2011/0138444 A1 * | 6/2011 | Kang et al. ............... 726/3 |
| 2011/0145848 A1 | 6/2011 | Moskowitz et al. |
| 2011/0216768 A1 * | 9/2011 | Ohashi et al. ............... 370/389 |
| 2011/0221969 A1 | 9/2011 | Dacosta |
| 2011/0237238 A1 | 9/2011 | Hassan et al. |
| 2011/0258678 A1 | 10/2011 | Cowling et al. |
| 2012/0000983 A1 * | 1/2012 | Bhagwan et al. ........ 235/462.04 |
| 2012/0020428 A1 * | 1/2012 | Roth et al. ............... 375/295 |

OTHER PUBLICATIONS

Communication, dated Apr. 22, 2014, issued by the European Patent Office in counterpart European Application No. 13 162 353.0.

* cited by examiner

DISPLAY APPARATUS AND CONTROL METHOD OF THE SAME

CROSS-REFERENCE TO RELATED APPLICATION

This application claims priority from Korean Patent Application No. 10-2012-0051351, filed on May 15, 2012 in the Korean Intellectual Property Office, the disclosure of which is incorporated herein by reference.

BACKGROUND

1. Field

Apparatuses and methods consistent with exemplary embodiments relate to a display apparatus and a control method of the same, and more particularly, to a display apparatus and a control method of the same which notifies a user of whether a mobile device interferes with a channel of a display apparatus.

2. Description of the Related Art

In the environment in which a display apparatus is connected to a mobile device in a wireless manner, a wireless signal from the mobile device may cause channel interference with the display apparatus. A user may not recognize whether the deterioration of an image quality has resulted from the channel interference of the mobile device connected to the display apparatus and thus cannot resolve the interference issue.

SUMMARY

One or more exemplary embodiments provide a display apparatus and a control method of the same which notifies a user of whether there is any channel interference caused by a mobile device connected to the display apparatus and enables a user to resolve the interference issue.

According to an aspect of an exemplary embodiment, there is provided a display apparatus including: a receiver which receives a broadcasting signal; a display which displays an image thereon based on the received broadcasting signal; a communication unit which communicates with a mobile device; and a controller which determines whether the mobile device interferes with at least one of a plurality of broadcasting channels received through the receiver, and controls the display to display thereon a user interface (UI) which notifies a user whether image noise has resulted from the channel interference by the mobile device.

The controller may control the receiver to scan the at least one channel, determines whether the mobile device interferes with the at least one channel, and controls the display to display thereon a UI showing the determination result.

The controller may control the display to display thereon the UI which guides the user to connect the mobile device to the display apparatus.

The controller may control the display to display thereon a UI guiding which guides the user to place the mobile device adjacent to the display apparatus.

The controller may control the display to display thereon a UI showing that the controller is making a determination regarding the channel interference caused by the mobile device.

The controller may control the display to display thereon a UI which guides the user to place the mobile device at a predetermined distance from the display apparatus upon an occurrence of channel interference caused by the mobile device.

The controller may control the mobile device to adjust a strength of a wireless signal transmitted by the mobile device, and determines that the mobile device interferes with the at least one channel when a packet error rate of the broadcasting signal changes corresponding to the adjusted strength.

The strength of the wireless signal of the mobile device may be adjusted by turning on or turning off an airplane mode of the mobile device.

According to an aspect of an exemplary embodiment, there is provided a control method of a display apparatus including: connecting a mobile device to the display apparatus; determining whether the mobile device interferes with at least one channel of a plurality of broadcasting channels received by the display apparatus; and notifying a user of a determination result so that the user recognizes whether image noise has resulted from the channel interference by the mobile device.

The method may further include guiding the user to place the mobile device at a predetermined distance from the display apparatus if the mobile device interferes with the at least one channel.

The method may further include notifying the user that the mobile device interferes with the at least one channel upon an occurrence of the interference with the at least one channel when the plurality of broadcasting channels are scanned; and guiding the user to place the mobile device at a predetermined distance from the display apparatus.

The determining whether the mobile device interferes with the at least one channel may include determining the channel interference according to a command of the user.

The determining whether the mobile device interferes with the at least one channel may include determining whether the mobile device interferes with the at least one channel if the image noise displayed in the display apparatus is a predetermined value or more.

The determining whether the mobile device interferes with the at least one channel may include determining on the basis of a strength of a wireless signal transmitted by the mobile device.

The method may further include detecting a strength of a wireless signal transmitted by the mobile device wherein if the detected strength is a predetermined value or more, determining that the mobile device interferes with the at least one channel.

The method further include requesting strength information of a wireless signal transmitted by the mobile device from the mobile device, and if the strength information is a predetermined value or more, determining that the mobile device interferes with the at least one channel.

The method further include adjusting a strength of a wireless signal transmitted by the mobile device and if the image noise changes corresponding to the adjusted strength, determining that the mobile device interferes with the at least one channel.

The adjusting the strength of the wireless signal transmitted by the mobile device may include adjusting the strength by turning on or turning off an airplane mode of the mobile device.

The method further includes guiding the user to adjust the strength of the wireless signal transmitted by the mobile device.

According to an aspect of an exemplary embodiment, there is provided a non-transitory computer readable medium comprising instructions to perform: communicating with a mobile device; determining whether the mobile device interferes with at least one channel of a plurality of broadcasting channels; and notifying a user that the mobile device interferes with the at least one channel.

The notifying the user may also include displaying a message to the user on a display apparatus.

The determining whether the mobile device interferes with the at least one channel may also include determining whether an image noise occurs on a display apparatus displaying the at least one channel based on a signal strength of the mobile device when the mobile device is located near the display apparatus.

The communicating with the mobile device may also include receiving signal strength information from the mobile device.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
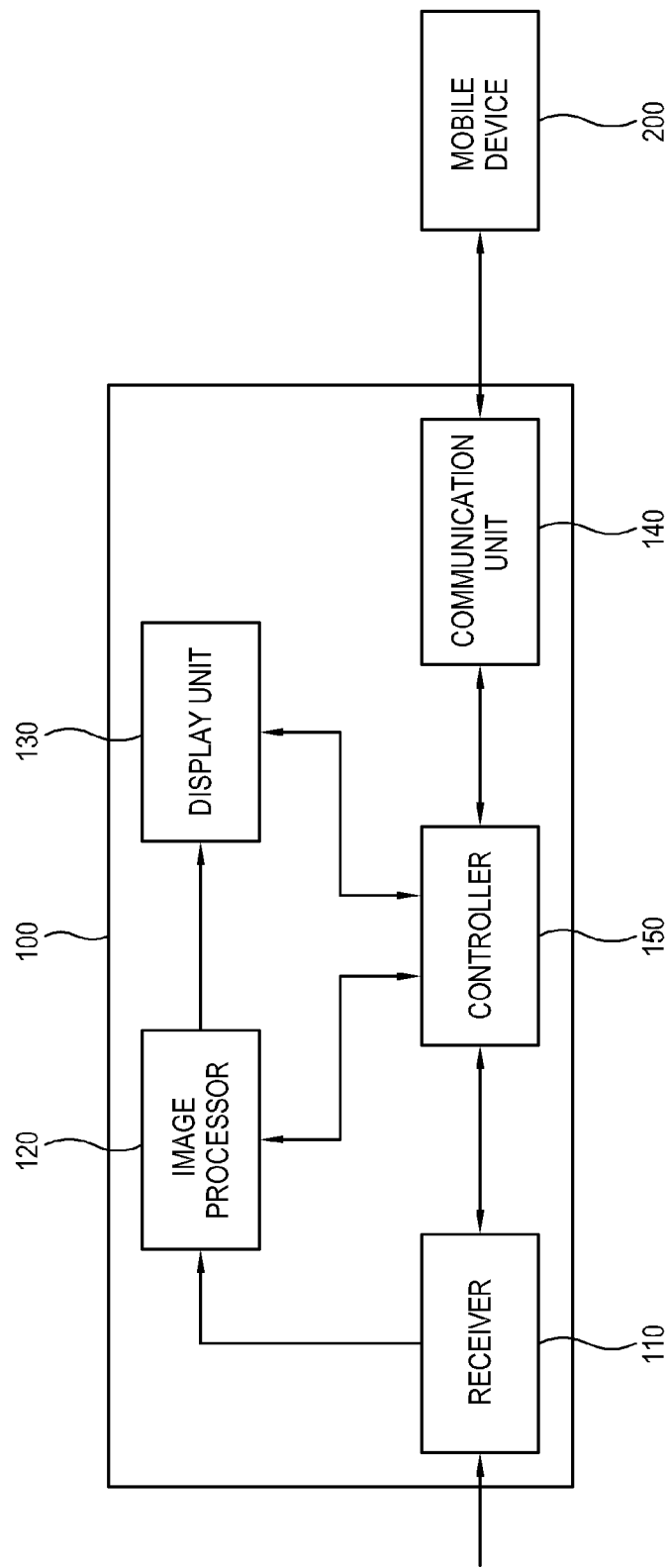
FIG. 1 is a block diagram of a display apparatus according to an exemplary embodiment.

Below, exemplary embodiments will be described in detail with reference to accompanying drawings so as to be easily understood by a person having ordinary skill in the art. The exemplary embodiments may be embodied in various forms without being limited to the exemplary embodiments set forth herein. Descriptions of well-known parts are omitted for clarity, and like reference numerals refer to like elements throughout the specification.

FIG. 1 is a block diagram of a display apparatus 100 according to an exemplary embodiment.

As shown therein, the display apparatus 100 includes a receiver 110 which receives a broadcasting signal including an image signal, an image processor 120 which processes an image signal received by the receiver 110, a display unit 130 (e.g., a display) which displays an image thereon based on an image signal processed by the image processor 120, a user input unit (not shown), a storage unit (not shown) which stores therein data/information, a communication unit 140 which communicates with a mobile device 200 and a controller 150 which controls the entire operation of the display apparatus 100.

The receiver 110 receives a broadcasting signal including an image signal from a broadcasting station, satellite, etc., and includes a tuner to tune a channel of a received broadcasting signal.

The image processor 120 processes a broadcasting signal including an image signal which is output by the receiver 110 and an image signal provided by an image supply source (not shown), according to predetermined processes. The image processor 120 outputs the processed image signal to the display unit 130, on which an image is displayed on the basis of the processed image signal.

The image processing of the image processor 120 performs a de-multiplexing operation for dividing a predetermined signal into signals by nature, a decoding operation corresponding to an image format of an image signal, a de-interlacing operation for converting an interlaced image signal into a progressive image signal, a scaling operation for scaling an image signal into a preset resolution, a noise reduction operation for improving image quality, a detail enhancement operation and a frame refresh rate conversion operation. However, exemplary embodiments are not limited thereto.

The display unit 130 displays an image based on an image signal output by the image processor 120. The display unit 130 may display video, still images, applications and an on-screen display (OSD) based on signals/data supplied by various image supply sources (not shown), and may display a graphic user interface (GUI) for controlling various operations. However, exemplary embodiments are not limited thereto.

The display unit 130 may include a liquid crystal panel, plasma, a light-emitting diode, an organic light-emitting diode, a surface-conduction electron-emitter, a carbon nanotube, and a nano-crystal. However, exemplary embodiments are not limited thereto.

The user input unit transmits preset various control commands or information to the controller 150 by a user's manipulation and input. The user input unit may include a menu key and an input panel installed in an external side of the display apparatus 100 or a remote controller which is separated from the display apparatus 100.

The user input unit may be integrally formed in the display unit 130. That is, if the display unit 130 includes a touch screen, a user may transmit a preset command to the controller 150 through an input menu displayed on the display unit 130.

The storage unit stores data by a control of the controller 150. The storage unit is implemented as a non-volatile memory such as a flash memory or a hard disc drive. The storage unit is accessed by the controller 150, which reads/records/modifies/deletes/updates data stored in the storage unit.

For example, the storage unit may store therein an operating system (OS) to drive the display apparatus 100 and other various applications which may be executed in the OS, image data, and additional data and setting information.

The communication unit 140 may exchange at least one of data, signals, information and power with the mobile device 200 as an external device. The communication unit 140 may communicate with the mobile device 200 in a wireless local area network (WLAN), and include a Wi-Fi module.

The controller 150 controls the entire operation of the display apparatus 100. The controller 150 controls the receiver 110, which receives a broadcasting signal, to tune a channel, controls the image processor 120 to process an image signal including a broadcasting signal, controls the display unit 130 to display the processed image thereon, controls other elements of the display apparatus 100 corresponding to a user's command input through the user input unit, and controls a UI generator (not shown) to generate various UI screens which will be described later.

The controller 150 determines whether the mobile device 200 interferes with at least one of a plurality of broadcasting channels received by the receiver 110. For example, the controller 150 controls the mobile device 100 to adjust a strength of a wireless signal transmitted by the mobile device 200, and may determine that the mobile device 200 interferes with a channel in which a packet error rate of a broadcasting signal changes corresponding to the adjusted strength of the signal.

The controller 150 may control the receiver 110 to sequentially scan each channel of a received broadcasting signal, and determine whether the mobile device 200 interferes with each scanned channel. That is, if it is determined that a particular channel has a high packet error rate while the channel is being scanned, the controller 150 controls the mobile device 200 to adjust the strength of a wireless signal transmitted by the mobile device 200. If the packet error rate of the broadcasting signal is changed corresponding to the adjusted strength of the wireless signal, the controller 150 may determine that the mobile device 200 interferes with the particular channel.

In adjusting the strength of the wireless signal transmitted by the mobile device 200, the controller 150 may determine channel interference by turning on/off an airplane mode included in the mobile device 200. That is, if the packet error rate of the broadcasting signal is high in the state where the airplane mode of the mobile device 200 is OFF, the controller 150 controls the mobile device 200 to turn on the airplane mode of the mobile device 200. If the packet error rate of the broadcasting signal is reduced corresponding to the changed mode, the controller 150 may determine that the mobile device 200 interferes with the channel.

To notify a user of the determination result, the controller 150 controls the UI generator to generate a UI screen and controls the display unit 130 to display the generated UI screen thereon to show the determination result regarding the channel interference. That is, the controller 150 may generate a UI screen showing the existence of the channel interference caused by the mobile device 200 in a particular channel of the broadcasting signal and display the UI screen on the display unit 130. If it is determined that the mobile device 200 does not interfere with the channel, the controller 150 may generate a UI screen showing the absence of channel interference caused by the mobile device 200 and display the UI screen on the display unit 130.

If it is determined that the mobile device 200 interferes with the channel, the controller 150 may generate a UI screen and display the UI screen on the display unit 130 to guide a user to space the mobile device 200 from the display apparatus 100 at a predetermined distance, to thereby avoid the channel interference of the mobile device 200.

The controller 150 may monitor an occurrence/non-occurrence of noise in an image displayed on the display unit 130, and upon an occurrence of noise, determine whether the mobile device 200 interferes with a channel. Further, the controller 150 may determine whether the mobile device 200 interferes with a channel corresponding to a user's command input through the user input unit.

The controller 150 may determine whether the mobile device 200 and the display apparatus 100 are connected through the communication unit 140 of the display apparatus 100. For example, the communication unit 140 of the display apparatus 100 may include a WLAN module such as a Wi-Fi component, perform wireless communication with the mobile device 200 by using the Wi-Fi component, and determine whether the mobile device 200 is connected to the display apparatus 100.

To determine whether the mobile device 200 interferes with a channel, the controller 150 may generate a UI screen and display the UI screen on the display unit 130 to guide a user to connect the mobile device 200 to the display apparatus 100 if the mobile device 200 is not connected to the display apparatus 100.

The controller 150 may generate and display a UI screen on the display unit 130 to guide a user to place the mobile device 200 adjacent to the display apparatus 100.

To notify a user that the controller 150 is on determination regarding the channel interference by the mobile device 200, the controller 150 may generate and display a UI screen on the display unit 130 to indicate that it is currently identifying whether the mobile device 200 interferes with a channel of the display apparatus 100.

Hereinafter, a control method of the display apparatus 100 according to an exemplary embodiment will be described with reference to FIGS. 2 to 8.

Figure 2:
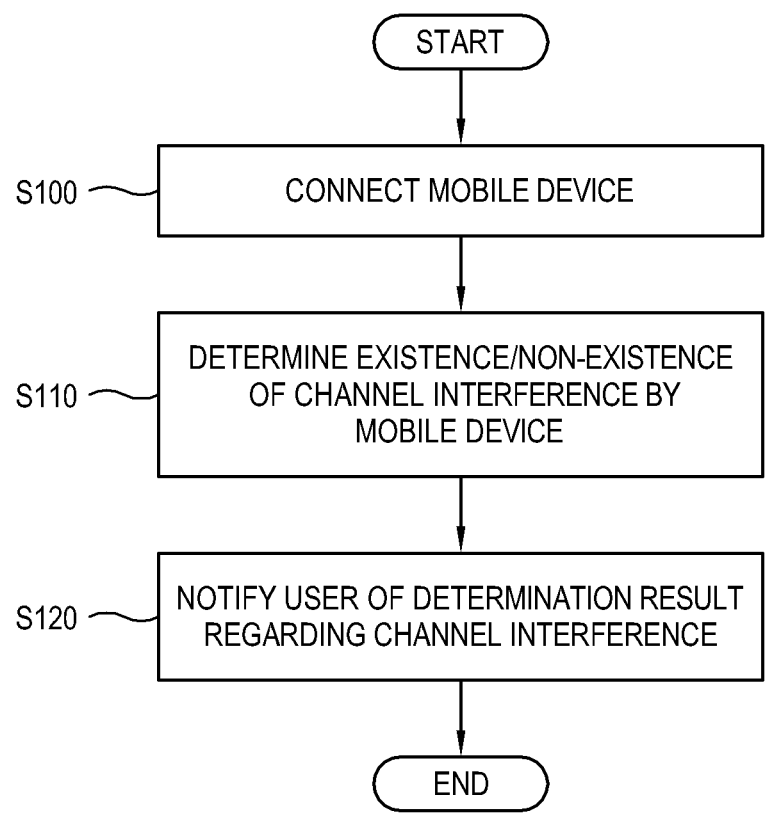
FIG. 2 is a flowchart showing a control method of the display apparatus according to an exemplary embodiment.

As shown in FIG. 2, to determine whether the mobile device 200 interferes with a channel, a user connects the mobile device 200 to the display apparatus 100 (S100). The controller 150 may determine whether the mobile device 200 and the display apparatus 100 are connected through the communication unit 140 of the display apparatus 100. For example, the controller 150 may perform wireless communication with the mobile device 200 by using Wi-Fi, and determine whether the mobile device 200 is connected to the display apparatus 100.

Figure 3:
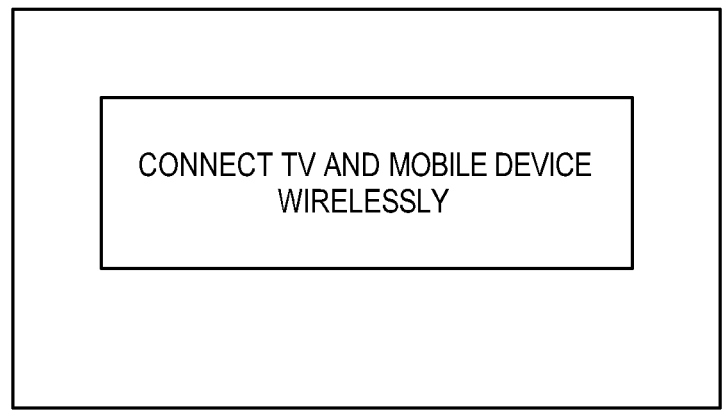
FIGS. 3 to 8 illustrate examples of a user interface (UI) screen which is displayed in the display apparatus according to aspects of exemplary embodiments.
Figure 4:
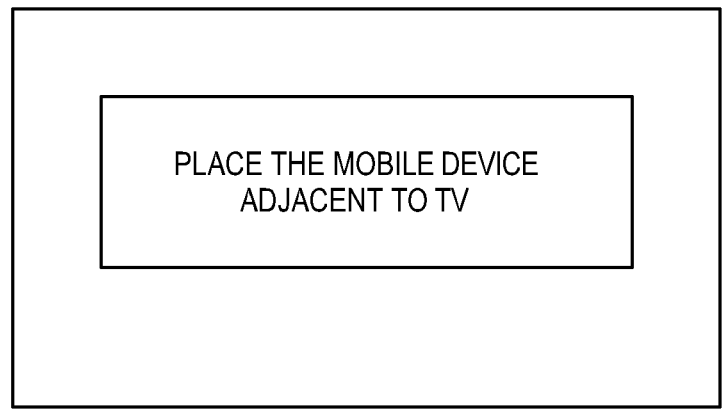

If the mobile device 200 is not connected to the display apparatus 100, the controller 150 may control the display unit 130 to display thereon a UI screen that guides a user to connect the mobile device 200 to the display apparatus 100 as shown in FIG. 3. As shown in FIG. 4, the controller 150 may control the display unit 130 to display thereon a UI screen guiding a user to locate the mobile device 200 within a predetermined distance of the display apparatus 100.

The operation S100 may be performed corresponding to a user's command input through the user input unit. Otherwise, the controller 150 may monitor for an occurrence of image noise displayed on the display unit 130 and if the noise is a predetermined value or more, may perform the operation S100 corresponding to the noise. The occurrence/non-occurrence of image noise may be determined on the basis of a signal to noise ratio (SNR).

The controller 150 determines whether the mobile device 200 interferes with at least one of a plurality of broadcasting channels received by the display apparatus 100 (S110).

The controller 150 controls the receiver 110 to sequentially scan each channel of the received broadcasting signal, and determine whether the mobile device 200 interferes with each scanned channel.

More specifically, the controller 150 may determine whether the mobile device 200 interferes with a channel, based on the strength of the wireless signal transmitted by the mobile device 200. For example, the controller 150 may detect the strength of the wireless signal transmitted by the mobile device 200 and if the strength is a predetermined value or more, may determine that the mobile device 200 interferes with the channel.

The controller 150 may request strength information of the wireless signal to the mobile device 200 through the communication unit 140 (e.g., a transceiver), and if the strength information of the wireless signal is a predetermined value or more, may determine that the mobile device 200 interferes with the channel.

The controller 150 may adjust the strength of the wireless signal transmitted by the mobile device 200, and if an occurrence or non-occurrence of image noise changes corresponding to the adjusted strength, may determine that the mobile device 200 interferes with the channel. For example, the controller 150 may adjust the strength of the wireless signal transmitted by the mobile device 200 by turning on/off an airplane mode of the mobile device 200.

The controller 150 may generate a UI screen and control the display unit 130 to display the UI screen thereon to guide a user to adjust the strength of the wireless signal transmitted by the mobile device 200.

If a packet error rate of a broadcasting signal is high on a particular channel, the controller 150 may control the mobile device 200 to adjust the strength of the wireless signal transmitted by the mobile device 200. If the packet error rate of the broadcasting signal changes corresponding to the adjusted strength of the wireless signal, the controller 150 may determine that the mobile device 200 interferes with the particular channel.

Figure 5:
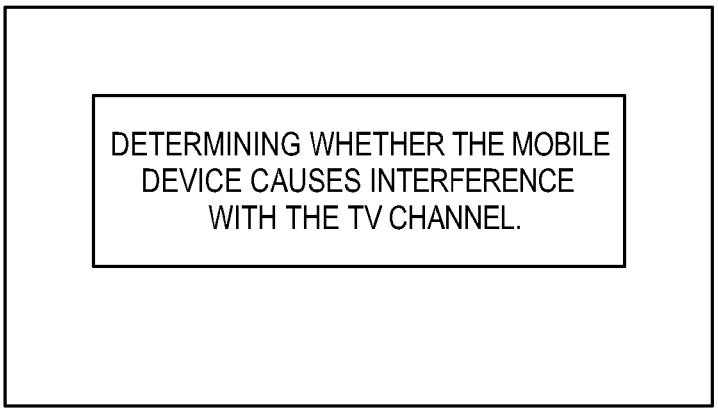
Figure 6:
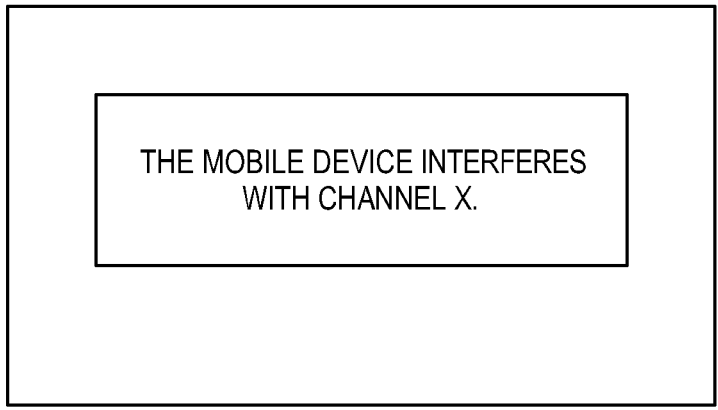
Figure 7:
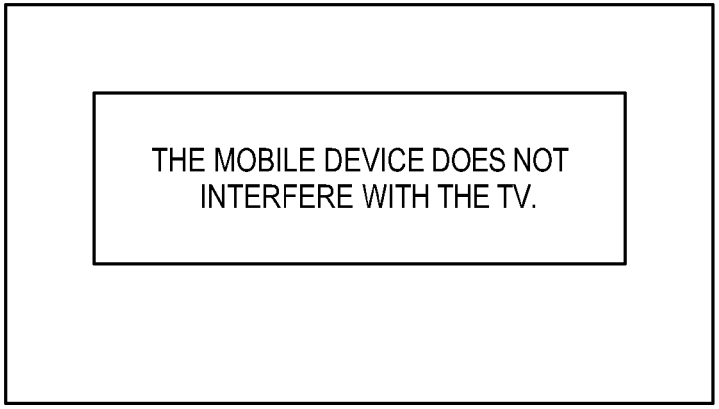

To notify a user of the fact that the controller 150 has made a determination regarding the channel interference by the mobile device 200, the controller 150 may generate and display a UI screen on the display unit 130 to indicate that it has determined the interference of the mobile device 200 in the channel of the display apparatus 100, as shown in FIG. 5.

The controller 150 notifies a user of the determination result regarding the channel interference by the mobile device 200 (S120). That is, if it is determined that the mobile device 200 interferes with a particular channel of a received broadcasting signal, the controller 150 displays the notification of the occurrence of the channel interference by the mobile device 200 in the particular channel as in FIG. 6. If it is determined that the mobile device 200 does not interfere with the channel, the controller 150 may display a notification of the non-occurrence of the channel interference by the mobile device 200 as in FIG. 7.

Figure 8:
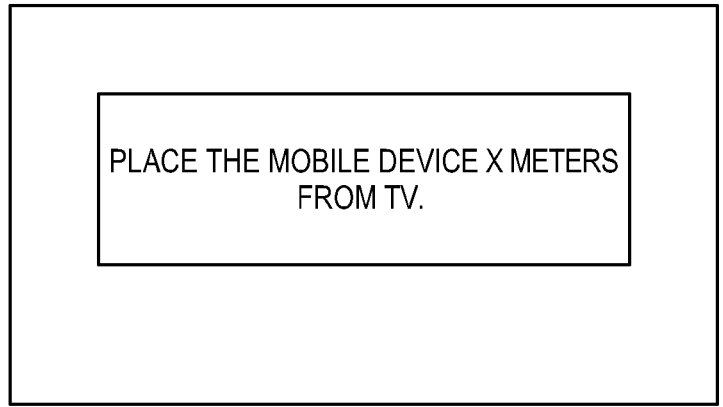

If it is determined that the mobile device 200 interferes with a channel, the controller 150 may generate a UI screen and control the display unit 130 to display the UI screen thereon to guide a user to space the mobile device 200 from the display apparatus 100 at a predetermined distance to thereby avoid the channel interference, as shown in FIG. 8.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers comprising processors and/or circuitry that execute the programs Although a few exemplary embodiments have been shown and described, it will be appreciated by those skilled in the art that changes may be made in these exemplary embodiments without departing from the principles and spirit of the inventive concept, the range of which is defined in the appended claims and their equivalents.

What is claimed is:

1. A display apparatus comprising:
a receiver which receives a broadcasting signal;
a display which displays an image based on the received broadcasting signal;
a communication unit which communicates with a mobile device; and
a controller which determines whether the mobile device interferes with at least one channel of a plurality of broadcasting channels received through the receiver, and controls the display to display a user interface (UI) which indicates whether image noise has resulted from channel interference by the mobile device,
wherein the controller determines whether the mobile device interferes with the at least one channel if the image noise displayed in the display apparatus is greater than or equal to a predetermined value.

2. The display apparatus according to claim 1, wherein the controller controls the receiver to scan the at least one channels, determines whether the mobile device interferes with the at least one channel, and controls the display to display a UI showing a result of the determination.

3. The display apparatus according to claim 1, wherein the controller controls the display to display a UI providing instructions to connect the mobile device to the display apparatus.

4. The display apparatus according to claim 1, wherein the controller controls the display to display thereon a UI providing instructions to place the mobile device adjacent to the display apparatus.

5. The display apparatus according to claim 1, wherein the controller controls the display to display a UI showing that the controller is making a determination regarding the channel interference caused by the mobile device.

6. The display apparatus according to claim 1, wherein the controller controls the display to display thereon a UI providing instructions to place the mobile device at a predetermined distance from the display apparatus upon an occurrence of channel interference caused by the mobile device.

7. The display apparatus according to claim 1, wherein the controller controls the mobile device to adjust a strength of a wireless signal transmitted by the mobile device, and determines that the mobile device interferes with the at least one channel when a packet error rate of the broadcasting signal changes corresponding to the adjusted strength.

8. The display apparatus according to claim 7, wherein the strength of the wireless signal of the mobile device is adjusted by turning on or turning off an airplane mode of the mobile device.

9. A control method of a display apparatus, the control method comprising:
connecting a mobile device to the display apparatus;
determining whether the mobile device interferes with at least one channel of a plurality of broadcasting channels received by the display apparatus; and
displaying a result of the determining,
wherein the determining whether the mobile device interferes with the at least one channel comprises determining whether the mobile device interferes with the at least one channel if the image noise displayed in the display apparatus is greater than or equal to a predetermined value.

10. The control method according to claim 9, further comprising:
displaying instructions to place the mobile device at a predetermined distance from the display apparatus if the mobile device interferes with the at least one channel.

11. The control method according to claim 9, further comprising:
displaying a notification that the mobile device interferes with the at least one channel upon an occurrence of the interference with the at least one channel when the plurality of broadcasting channels are scanned; and
displaying instructions to place the mobile device at a predetermined distance from the display apparatus.

12. The control method according to claim 9, wherein the determining whether the mobile device interferes with the at least one channel comprises determining the channel interference according to an input command.

13. The control method according to claim 9, wherein the determining whether the mobile device interferes with the at least one channel comprises determining on the basis of a strength of a wireless signal transmitted by the mobile device.

14. The control method according to claim 9, further comprising:
   detecting a strength of a wireless signal transmitted by the mobile device,
   wherein if the detected strength is greater than or equal to a predetermined value, determining that the mobile device interferes with the at least one channel.

15. The control method according to claim 9, further comprising:
   requesting strength information of a wireless signal transmitted by the mobile device from the mobile device, and if the strength information is greater than or equal to a predetermined value, determining that the mobile device interferes with the at least one channel.

16. The control method according to claim 9, further comprising:
   adjusting a strength of a wireless signal transmitted by the mobile device and if the image noise is changes corresponding to the adjusted strength, determining that the mobile device interferes with the at least one channel.

17. The control method according to claim 16, wherein the adjusting the strength of the wireless signal transmitted by the mobile device comprises adjusting the strength by turning on or turning off an airplane mode of the mobile device.

18. The control method according to claim 16, further comprising:
   displaying an instruction to adjust the strength of the wireless signal transmitted by the mobile device.

19. A non-transitory computer readable medium storing instructions to perform a method comprising:
   communicating with a mobile device;
   determining whether the mobile device interferes with at least one channel of a plurality of broadcasting channels; and
   displaying a result of the determining whether the mobile device interferes with the at least one channel,
   wherein the determining whether the mobile device interferes with the at least one channel comprises determining whether the mobile device interferes with the at least one channel if the image noise displayed in the display apparatus is greater than or equal to a predetermined value.

20. The non-transitory computer readable medium of claim 19, wherein the determining whether the mobile device interferes with the at least one channel comprises determining whether an image noise occurs on a display apparatus displaying the at least one channel based on a signal strength of the mobile device when the mobile device is located near the display apparatus.

21. The non-transitory computer readable medium of claim 19, wherein the communicating with the mobile device comprises receiving signal strength information from the mobile device.

\* \* \* \* \*